United States Patent [19]

Ohta et al.

[11] Patent Number: 5,490,131
[45] Date of Patent: Feb. 6, 1996

[54] OPTICAL DISK

[75] Inventors: Kenji Ohta, Kitakatsuragi; Toshikazu Nagaura; Masayasu Futagawa, both of Nara; Shinji Yamagami, Tenri; Yoshiteru Murakami, Nishinomiya; Hiroyuki Ikenaga, Nara; Michinobu Mieda, Shiki; Tetsuya Inui; Akira Takahashi, both of Nara, all of Japan

[73] Assignee: Sharp Kabushiki Kaisha, Osaka, Japan

[21] Appl. No.: 731,790

[22] Filed: Jul. 18, 1991

[30] Foreign Application Priority Data

Jul. 20, 1990 [JP] Japan ................................ 2-193223
Dec. 19, 1990 [JP] Japan ................................ 2-403793
Dec. 19, 1990 [JP] Japan ................................ 2-418050

[51] Int. Cl.⁶ ........................... G11B 7/24; G11B 11/12
[52] U.S. Cl. .................................................. 369/275.5
[58] Field of Search ........................... 369/13, 284, 286, 369/288, 275.5; 360/59, 114; 428/694, 695, 900

[56] References Cited

U.S. PATENT DOCUMENTS

| 4,826,739 | 5/1989 | Isoe et al. | 428/694 |
| 4,833,031 | 5/1989 | Kurokawa et al. | 428/694 |
| 5,013,594 | 5/1991 | Mizumura et al. | 369/288 |

FOREIGN PATENT DOCUMENTS

| 60-239946 | 11/1985 | Japan . | |
| 62-20156 | 1/1987 | Japan . | |
| 62-38544 | 2/1987 | Japan | 360/114 |
| 63-70945 | 3/1988 | Japan . | |
| 63-69048 | 3/1988 | Japan | 360/114 |
| 2-18729 | 1/1990 | Japan . | |

Primary Examiner—Hoa T. Nguyen
Attorney, Agent, or Firm—David G. Conlin; Kevin J. Fournier

[57] ABSTRACT

An optical disk including a transparent plastic substrate, a recording film formed on an one side surface of said substrate, a first protective film covering said recording film, and a moisture-impermeable film formed on the other side surface of said substrate via or not via an intermediate film.

29 Claims, 6 Drawing Sheets

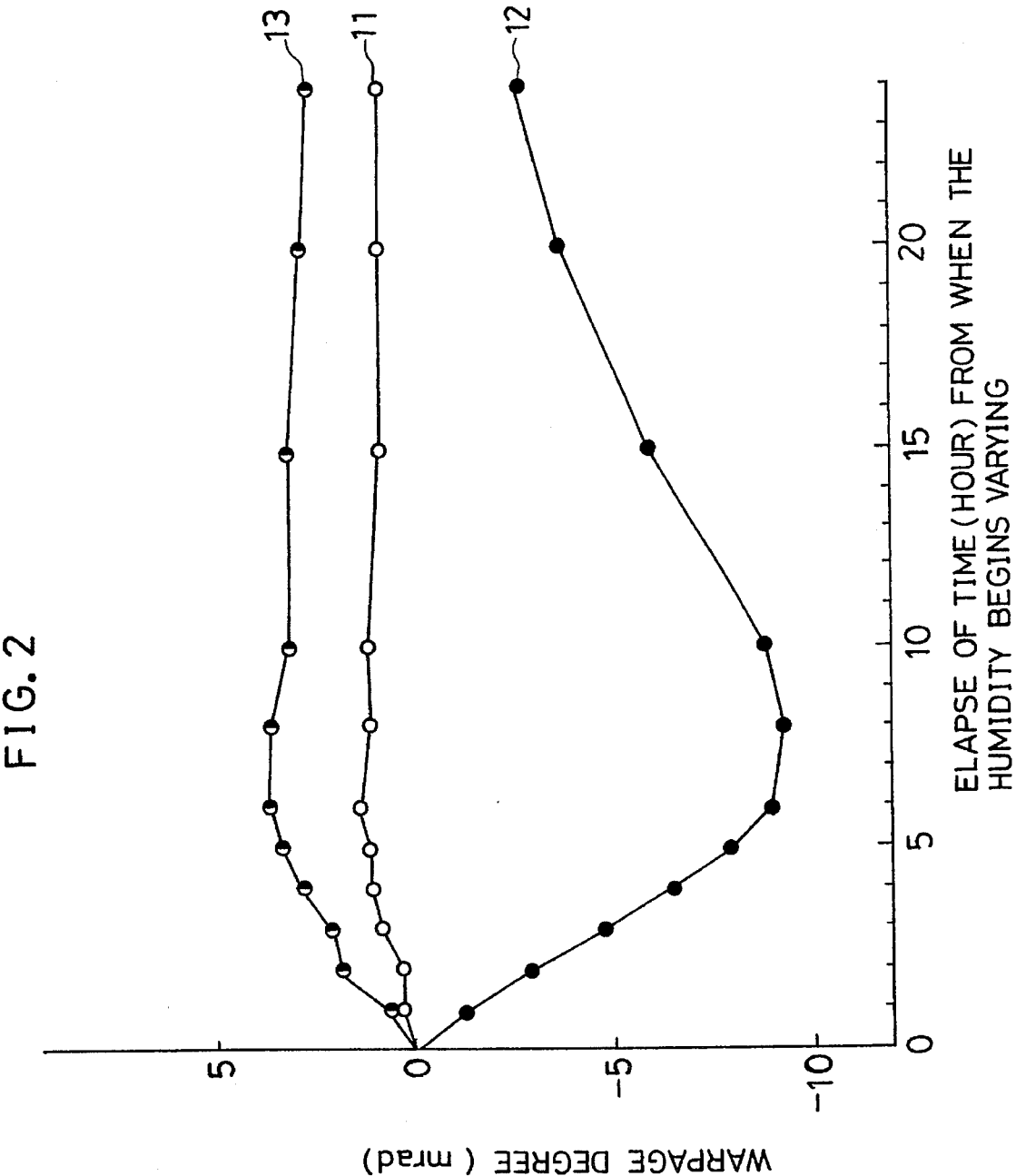

OPTICAL DISK

BACKGROUND OF THE INVENTION

1. Field of the Invention

The present invention relates to an optical disk for recording, erasing or reproducing information by utilizing a laser beam, and more particularly to an optical disk arrangement for preventing substrate warpage when a plastic substrate is used therein.

2. Prior Arts

In a conventional optical disk of the above type, as shown in FIG. 10, a recording layer 21 is formed on one side of a plastic substrate 20 and is protected by a protective film 22. The recording film 21 has usually a four-layer or three-layer structure, and thus moisture hardly penetrates from the protective film 22 side to the plastic substrate 20. Accordingly, moisture penetrates to or desorbs from the substrate only in the other side of the substrate 20, i.e., the beam-incident side thereof. The absorption or desorption of moisture causes a local volume change of the substrate 20, leading to substrate warpage.

In the case of the optical disk having a plastic substrate, the substrate having a warpage to a significant extent is slanted relative to the optical axis of a converged light beam. In this case the converged light beam does not run along, the center of a guide groove even if the tracking servo mechanism is working, degrading signal quality. If the substrate is further warped, even the tracking servo mechanism becomes useless, and thus the disk itself becomes worthless. For this reason, it is required that the acceptable warpage degree be within a certain range. As shown in TABLE 1, there is a regulation of acceptable warpage degrees of optical disks.

TABLE 1

| Type of Optical Disk | Warpage Degree |
| --- | --- |
| Compact Disk | 10 mrad or less |
| Write-Once type Disk | 5 mrad or less |
| Magneto-Optic Disk | 5 mrad or less |

As for compact disks, warpage is acceptable to a relatively high degree as compared with the case of other types of disk because the number of revolutions required for the disks is relatively small (200–500 rpm) and thus the tracking servo mechanism or focusing servo mechanism can sufficiently align a light-beam with the groove.

As for write-once type disks and rewritable disks (magneto-optical disks), warpage is limited to a relatively low degree allowing for the beam-alignment capability of the servo mechanism or focusing servo mechanism because such disks are required to turn at high speed (for example, 1800–3600 rpm) in order to realize a higher data-transfer rate. However, it has been difficult to minimize the warpage degree when a single substrate is used. Therefore, it has been a conventional practice to bond a single-substrate disk to another to form a both-face type disk, thereby reducing the warpage degree.

Recently, an attention has been attracted to an overwrite technique particularly for magnetooptical disks, and thus the needs for single-substrate disks have been increased. For rewriting data, a conventional magnetooptical disk requires to be turned twice, once for erasing the existing data; once for recording new data. In contrast a magnetooptical disk using the overwrite technique requires to be turned only once for both erasing the existing data and recording new data, thereby improving the data transfer rate.

Among various modes being studied for the overwrite technique, a magnetic-field modulation is considered to be promising. A conventional overwrite technique uses light modulation and performs information recording on the basis of ON-OFF of light with the magnetic field direction kept constant. On the other hand, an overwrite technique using the magnetic-field modulation performs information recording by changing the magnetic field direction.

In the case of overwrite technique using magnetic-field modulation, the magnetic field direction must be changed at high speed, and high-speed magnetic field modulation with a minimized electric consumption of an electromagnet requires to minimize the distance between the electromagnet and the recording film. With the abovementioned both-face type disk, it is difficult to minimize the distance between the recording film and the electromagnet because one substrate intervenes therebetween. Accordingly, a single-substrate type optical disk becomes necessary, as stated above.

In the case of using a plastic substrate in a single-substrate type disk, warpage of the substrate becomes a problem, as noted above. Warpage caused immediately the fabrication of a disk has been reduced to sufficiently meet the regulation of Table 1. However, it has been recently found that optical disks are prone to further warp during their operation. That is, the transaction of Japanese Applied Physics Meeting, p. 872 (1988/spring) reported that transitive warpage occurred during the change of environmental conditions. For instance, when the humidity varies from 60° C., 90% RH to 60° C., 50% RH, the warpage degree reaches beyond 10 mrad at maximum.

SUMMARY OF THE INVENTION

The present invention is accomplished for overcoming the abovementioned problems, and an object thereof is to provide an optical disk with minimized transitive warpage.

Thus, the present invention provides an optical disk comprising a transparent plastic substrate, a recording film formed on one side surface of said substrate, a first protective film covering said recording film, and a moisture-impermeable film formed on the other side surface of said substrate via or not via an intermediate film.

BRIEF DESCRIPTION OF THE DRAWINGS

FIG. 2 is a graph showing a variation of warpage degree of the optical disk shown in FIG. 1;

DETAILED DESCRIPTION OF THE PREFERRED EMBODIMENTS

Figure 1:
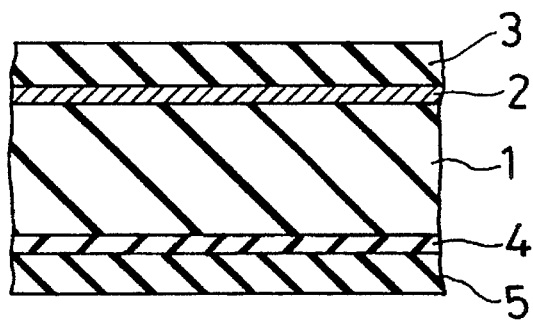
FIG. 1 is a sectional view illustrating a structure of an optical disk fabricated in Example 1 of the invention.
Figure 3:
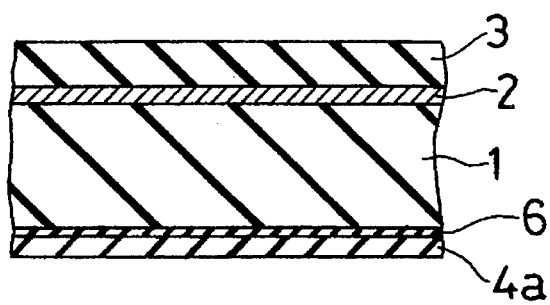
FIG. 3 is a sectional view illustrating a structure of an optical disk fabricated in Example 2 of the invention.

The above-noted transparent plastic substrate may be made of any plastic material which is transparent and hard to deform. A polycarbonate substrate may be typically used for the substrate, but another type of substrate such as of an acrylate resin and an epoxy resin may also be suitably used therefor. The thickness of the substrate is usually 1.15–1.25 mm.

For the recording film, a wide variety of known films may be used, for example, a four-layer structure film of AlN/GdTbFe/AlN/Al or AlN/DyFeCo/AlN/Al, a three-layer structure film of SiN/TbFeCo/SiN or SiAlON/TbFeCo/SiAlON, etc. The thickness of the recording film is usually 150–300 nm. The recording film is usually formed on the entire surface of one side of the substrate, but may be formed on a part of the substrate.

The protective film is provided for protecting the recording film and is formed from, for example, a UV-setting urethane acrylate resin, polyvinylidene chloride resin, or polytrifluorochloroethylene resin. The protective film can be formed by coating to usually 2–20 μm thick.

The moisture-impermeable film may be selected from inorganic moisture-impermeable films such as of AlN, SiN, ZnS, $Al_2O_3$, $SiO_2$, SiAlON, or from organic moisture-impermeable films such as of polyvinylidene chloride and polytrifluorochloroethylene. Among them particularly preferred is an AlN film. The thickness of the moisture-impermeable film depends on the material used therefor. As for the inorganic films, the film thickness is usually 1–300 nm, and preferably 1–200 nm. As for the organic films, the film thickness is usually 2–20 μm, and preferably 2–15 μm. In the case of a AlN film, for example, the preferred film thickness is 1–20 nm. If the film thickness is within the above range, transitive warpage of the optical disk can be prevented, and at the same time, interference fringe does not appear on the disk. Examination of the relationship between interference fringe and the reflectance of an optical disk has revealed that interference fringe is not observed with respect to a disk having a reflectance of about 8% or less. With an optical disk provided with a moisture-impermeable film of $SiO_2$ having even 250 nm thick, the transitive warpage can be prevented, and interference fringe does not appear.

The intermediate film is provided for the adherence of the moisture-impermeable film to the substrate while maintaining the uniform transmittance of light, and is very effective for enhancing the adherence to thereby preventing the moisture-impermeable film from peeling when the organic moisture-impermeable film is used. It is preferred that the intermediate film be uniformly coated for the uniform light-transmission. For this reason, the intermediate film may be preferably made of, for example, a UV-setting urethane acrylate resin and a polyurethane adhesive resin. The intermediate film is formed preferably to 2–10 μm thick.

A second protective film may be formed on the moisture-impermeable film for preventing warpage of the disk and for protecting the moisture-impermeable film. The second protective film preferably has substantially the same moisture-absorption characteristics as the first one, and is made desirably of the same material as that of the first one. If the materials and the thicknesses for the first and second protective films are designed so that one of the two protective films may substantially nullify the warpage caused by absorption-desorption of moisture of the other, the transitive warpage can be prevented. For example, the first protective film may be made of an acrylic hardcoat resin, while the second protective film may be of a UV-setting urethane acrylate resin. The thickness of the second protective film is usually 2–20 μm.

In the case where the first and second protective films respectively constitutes the outermost layers of the optical disk, the first protective film may be formed from a UV-setting urethane acrylate resin, while the second protective film may be formed from a UV-setting resin admixed with an antistatic agent or a transparent conductive filler described below. Otherwise, both the first and second protective films may be formed from a synthetic resin containing transparent conductive powder. Such arrangements serve to render the disk antistatic.

In the case where the four-layer structure of AlN/GdTbFe/AlN/Al is adopted as the recording film, it is convenient to form the moisture-impermeable film from AlN because the AlN layer of the recording film and the moisture-impermeable film can be formed simultaneously on respective side of the substrate using the same sputtering device and the same target, thereby reducing the production cost.

Further, the first protective film and the moisture-impermeable film may both be constituted by polyvinylidene chloride, polytrifluorochloroethylene or the like. In this case the second protective film can be omitted thereby to simplify the disk structure, and furthermore the use of the organic material for the films enables to reduce the production cost.

A film made of a synthetic resin containing a transparent conductive powder may be formed on the first protective film and the moisture-impermeable film or the second protective film. Such a film prevents dust from adhering to the disk surface while at the same time rendering the surface flaw-free, and which is desirably hard and relatively low in surface resistivity. It is preferred that the hardness of the film be more than HB in terms of pencil hardness, and the surface resistivity be less than about $10^{13}$ Ω/□. For forming the synthetic resin film, the synthetic resin or its raw material is mixed with the transparent conductive powder at a predetermined ratio and optionally a small amount of an organic material powder for enhancing the hardness, and the mixture is kneaded and applied onto the first protective film and the moisture-impermeable film or the second protective film. Examples of the synthetic resin are UV-setting urethane acrylate resins, UV-setting acrylic resins and the like. The transparent conductive powder may be made of $SnO_2$, $SiO_2$, $SnO_2$–$Sb_2O_5$, $In_2O_3$, $In_2O_3$–$SnO_2$ or the like. The mixing ratio of the synthetic resin to the transparent conductive powder is preferably 25/1 to 4/1 in volume. The synthetic resin mixture is applied onto the first protective film and the moisture-impermeable film or the second protective film by, for example, spin-coating, roll-coating and dip-coating, and is set by UV-ray irradiation, heating or cooling depending on the type of synthetic resin used. The thickness of the synthetic resin film is preferably 1–20 μm.

The optical disk to which the present invention is directed includes typically optical disks as well as compact disks, Write-Once type disks, photochromic type disks having a photochromic recording film and the like.

According to the present invention, the moisture-impermeable film significantly reduces the absorption of moisture by the optical disk, so that warpage of the disk can be prevented. Further, the synthetic resin film containing the transparent conductive powder renders the disk antistatic so as to inhibit the adherence of dust to the disk. As well, the high hardness of the synthetic resin film can render the disk substantially flaw-free.

EXAMPLES

Examples of the present invention will hereinafter be described with reference to the drawings. However, they are not limitative of the invention.

Example 1

As shown in FIG. 1, a recording film 2 is formed on one side surface of a transparent plastic substrate 1 made of polycarbonate and having a thickness of 1.2 mm. The recording film 2 is a magnetooptical recording film which generally has a four-layer structure. In this example the recording film 2 has a four-layer structure of AlN/GdTbFe/AlN/Al. The recording film 2 is in turn coated with a first protective film 3. The first protective film 3 is formed from a UV-setting urethane acrylate resin and has a thickness of about 10 μm.

A moisture-impermeable film 4 is formed on the other side surface of the substrate 1. In this example, $SiO_2$ is deposited to about 25 nm thick by sputtering to form the moisture-impermeable film 4. A second protective film 5 is formed over the moisture-impermeable film 4. The second protective film 5 is the same as the first protective film 3 in material (the UV-setting urethane acrylate resin) and in thickness. The thickness of the first and second protective films (UV-setting urethane acrylate resin film) may take any value provided that one of the two films nullify the warpage caused by the absorption-desorption of moisture of the other. However, it is required that the thicknesses of the two films be substantially the same on the aforesaid ground.

The optical disk of the above structure was allowed to stand for 24 hours under the conditions of 34° C. and 90% RH. The humidity was then reduced at 10% RH/hour for 6 hours to reach the conditions of 34° C., 30% RH, which conditions were maintained thereafter. Warpage (transitive warpage) degree of the plastic substrate 1 was measured from just before the humidity began varying and with the elapse of time. The result of the measurement is shown in FIG. 2.

In FIG. 2, the transitive warpage of the plastic substrate 1 is indicated by a curve 11 and is restrained within less than 2 mrad. A curve 12 indicates the transitive warpage of a conventional optical disk, which reaches 9 mrad. A curve 13 indicates the transitive warpage of a conventional optical disk of which beam-incident side is formed with a $SiO_2$ moisture-impermeable film of 25 nm thick by sputtering. In this case the warpage direction is opposite to that of the conventional optical disk of the curve 12.

It should be understood that the first protective film 3 may be formed from a UV-setting urethane acrylate resin, while the second protective film 5 may be formed from a UV-setting resin containing an antistatic agent.

Example 2

An optical disk was fabricated in the same manner as in Example 1 except that instead of forming on the other side of the substrate the $SiO_2$ film of 25 nm thick and the second protective film 5, an intermediate film 6 was formed thereon to 6 μm thick from a UV-setting urethane acrylate resin, and further a moisture-impermeable film 4a was formed to 10 μm thick from polyvinylidene chloride on the intermediate film 6; and that instead of using the AlN/GdTbFe/AlN/Al recording film 2, a AlN/DyFeCO/AlN/Al film was used for the recording film.

The optical disk thus obtained was subjected to a checkered tape peeling test to evaluate the adherence of the moisture-impermeable film. This test revealed a good adherence of the moisture-impermeable film.

Figure 5:
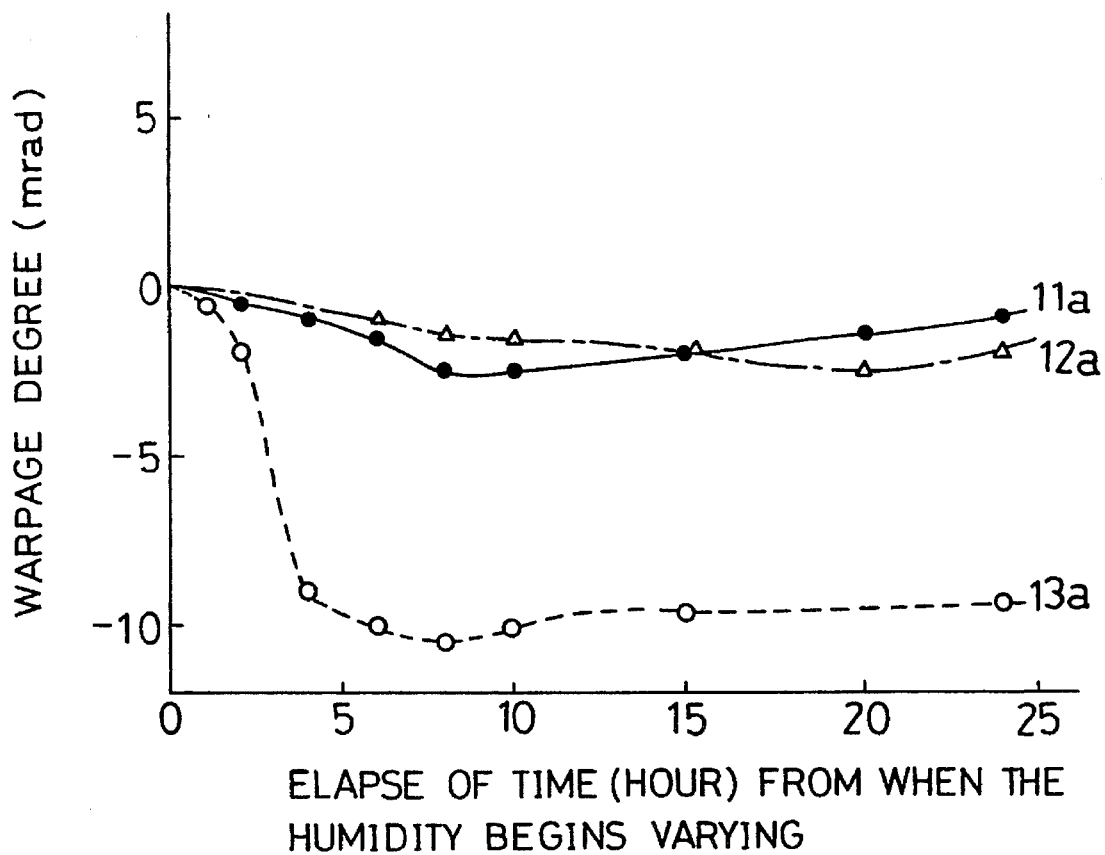
FIG. 5 is a graph showing variations of warpage degree of the optical disks respectively fabricated in Examples 2 and 3.

Further, the transitive warpage of the disk was measured as in Example 1, to find low degree warpage as indicated by a curve 11a in FIG. 5. To be noted that a curve 13a in FIG. 5 indicates the warpage variation of an conventional optical disk.

Example 3

Figure 4:
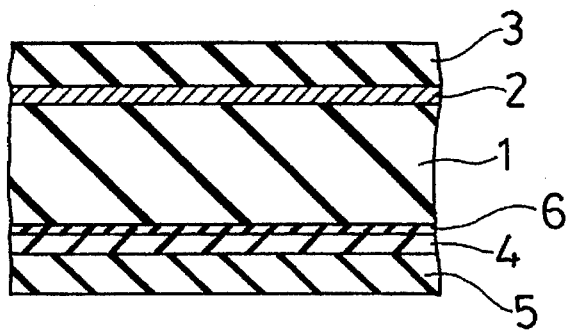
FIG. 4 is a sectional view illustrating a structure of an optical disk fabricated in Example 3 of the invention.

An optical disk was fabricated in the same manner as in Example 2 except that a second protective film was formed to 5 μm thick on the moisture-impermeable film 4 by coating a UV-setting resin containing an antistatic agent, as shown in FIG. 4. The warpage degree was satisfactorily low as less than 3 mrad as indicated by a curve 12a in FIG. 5.

Example 4

Figure 6:
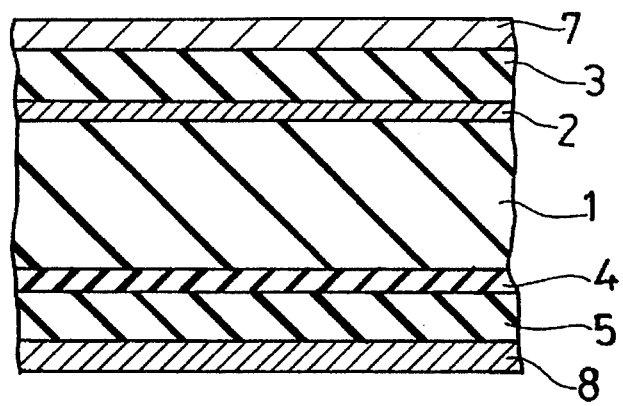
FIG. 6 is a sectional view illustrating a structure of an optical disk fabricated in Example 4 of the invention.

An optical disk was fabricated in the same manner as in Example 1 except that synthetic resin films 6 and 7 containing transparent conductive powder were formed on the first and second protective films 3 and 5 respectively, as shown in FIG. 6. The synthetic resin films 6 and 7 containing transparent conductive powder were prepared by kneading a mixture of a source material of UV-setting urethane acrylate resin, the transparent conductive powder and spin coating the mixture onto the first and second protective films, and irradiating UV rays to the coating mixture to set it so that the films may have 2 μm thick.

The degree of transitive warpage of the optical disk thus obtained was measured to find it as low as less than 2 mrad. The surface resistivity as an index of antistatic properties of the disk was $10^9$–$10^{12}$ Ω/□, and thus the disk exhibiting good antistatic properties. Further, the hardness of the disk was HB in terms of pencil hardness, which was sufficiently hard to render the disk flaw-free for practical use.

Example 5

Optical disks were fabricated in the same manner as in Example 1 except that instead of using the AlN/GdTbFe/AlN/Al film for the recording film, a AlN/DyFeCO/AlN/Al film was used therefor, and the moisture-impermeable film 4 was formed from AlN. The moisture-impermeable films of the disks were 5, 10, 20, 25 and 80 nm in thickness, respectively.

By viewing the disks from the second protective film side, observation of interference fringe was carried out. As a result, interference fringe was not observed on the disks having moisture-impermeable films of 5 nm and 10 nm. As for the disk having 20 nm thick film, slight interference fringe was observed when intensively watched but was of little eyesore. On the other hand, interference fringe was observed on the disk having the moisture-impermeable film of 25 nm thick. The clearest interference fringe appeared on the disk having 80 nm thick film.

Next, for examining the relationship between interference fringe and reflectance in varying the thickness of the moisture-impermeable film 4, calculated was the relationship between the thickness of the moisture-impermeable film 4 and the reflectance thereof as light was applied to the disk from the first protective film 5 side.

Calculation was performed with respect to three-layer models having sequentially a polycarbonate substrate as the plastic substrate 1, a AlN film as the moisture-impermeable film 4, and a UV-setting urethane acrylate resin film as the second protective film 5. Respective refractive indexes of the polycarbonate substrate, AlN film and UV-setting urethane acrylate resin film were 1.58, 2.1 and 1.5. The thickness of the second protective film was 10 μm. The wavelength of the light was 780 nm which was the wavelength of a semiconductor laser being widely used as a light source for optical disks. Reflectance was calculated with the thickness of the moisture-impermeable film 4 as a parameter varying within the range of 0–200 nm.

Figure 7:
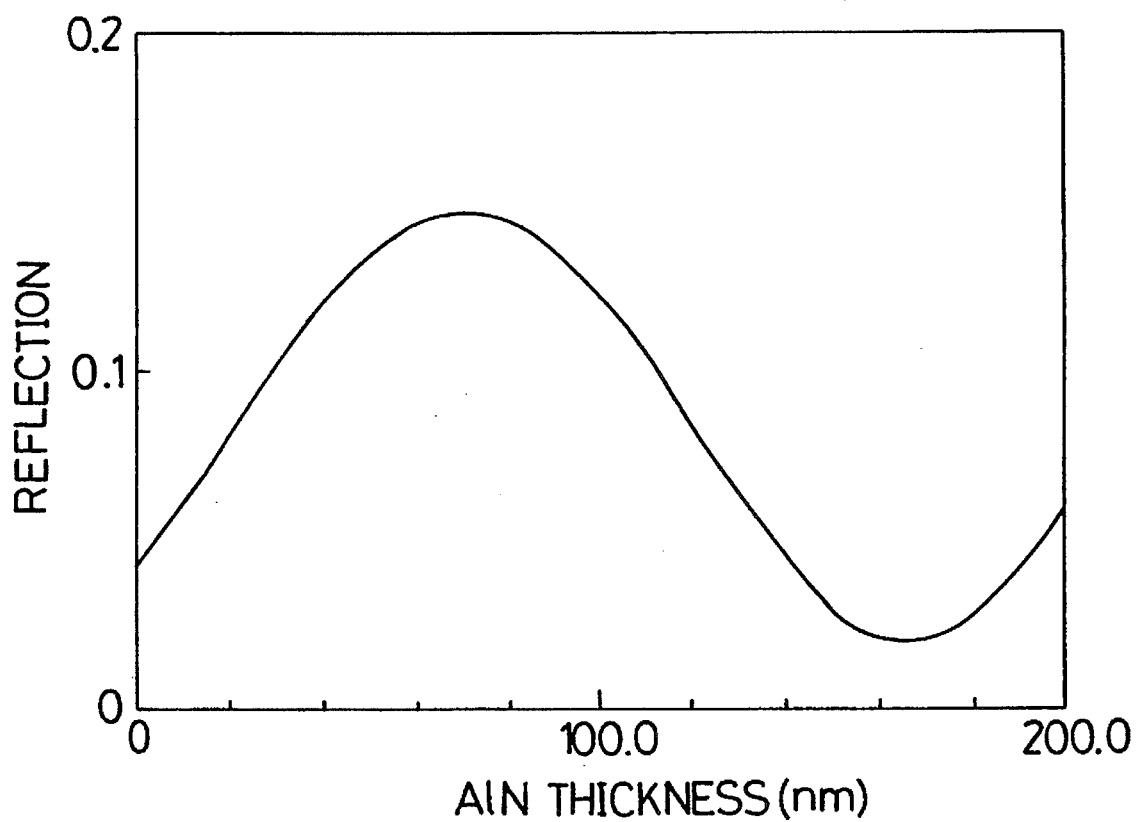
FIG. 7 is a graph showing the relationship between the thickness of a moisture-impermeable film (AlN) and the reflectance of the optical disk fabricated in Example 5.

The result of the calculation is shown by a graph in FIG. 7 in which a horizontal line represents the thickness of AlN film, and a vertical line represents the reflectance. The results of the abovementioned interference fringe observation and the reflectance calculation reveal that interference fringe almost disappears when the reflectance is less than about 8%.

Then, under the same conditions as in Example 1 examined was the relationship between the thickness of the moisture-impermeable film 4 and the warpage degree of an optical disk with the change of environmental conditions. In this examination used were the same optical disk as those fabricated above except that the thicknesses of the moisture-impermeable films 4 were 1, 5, 25 and 80 nm, respectively. For comparison, a conventional optical disk, which was substantially the same as those fabricated above except that the moisture-impermeable film 4 and the first protective film 5 were not provided.

Figure 8:
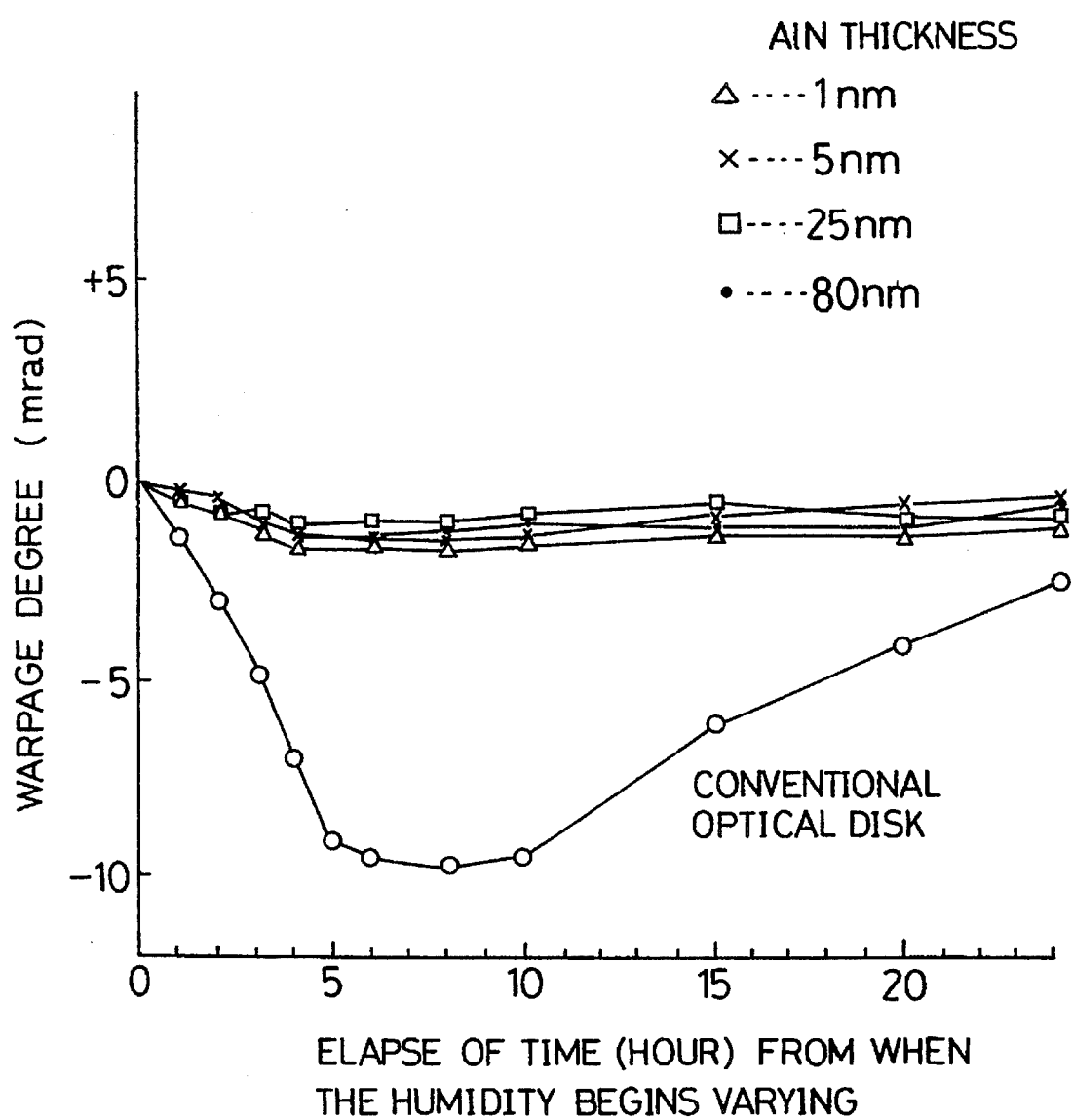
FIG. 8 is a graph showing variation of warpage degree of the optical disk fabricated in Example 5.

The result of the examination is shown by a graph in FIG. 8 in which a horizontal line represents time from the humidity began varying, and a vertical line represents the warpage degree. The graph reveals that the conventional disk with no moisture-impermeable film 4 and no first protective film 5 warped as large as 10 mrad, while the optical disks of this Example warped as small as less than 2 mrad. This lead to the conclusion that if the thickness of the AlN film as the moisture-impermeable film 4 is 1 nm or more, the transitive warpage can be sufficiently prevented.

Example 6

An optical disk was fabricated in the same manner as in Example 5 except that the second protective film on the moisture-impermeable film was further coated with an antistatic film of about 4 nm thick, the antistatic film being made of an acrylic hardcoat resin containing conductive filler. The thickness of moisture-impermeable (AlN) film was 5 nm.

When viewed the disk thus obtained from the antistatic film side, interference fringe was not observed. The warpage degree of the disk was as small as less than 2 mrad.

In this optical disk the antistatic film is provided on the incident side of a light beam used for recording, erasing and reproducing information, so that it becomes hard for dust acting to scatter the light beam to adhere to the surface of the disk. This leads to a significant reduction in degradation of recording or reproduction signals due to fluctuation or jump of the focusing servo or tracking servo mechanism during recording, erasing or reproducing information.

The transitive warpage degree of the disk was almost the same as that of the disk fabricated in Example 5. This is because there was no substantial difference in absorption-desorption of moisture between the UV-setting urethane acrylate resin film as the second protective film and the acrylic hardcoat resin film containing conductive filler as the antistatic film 6, and at the same time the total thickness of them was set to substantially the same as that of the first protective film, i.e., about 10 μm. In this connection, when only the thickness of the second protective film of the above disc was varied from 6 μm to 10 μm, the warpage was slightly enlarged.

Example 7

An optical disk was fabricated in the same manner as in Example 6 except that a lubricating film 7 made of a fluoro-type resin having good lubricating properties was formed to 2 μm thick on the first protective film.

When the disk thus obtained was viewed from the antistatic film side, interference fringe was not observed. Also, when the transitive warpage of this disk was measured in the same manner as in Example 1, the warpage degree was as small as less than 2 mrad.

Furthermore, when a floating magnetic head is used, the provision of the lubricating film 7 in the recording film side enables to enhance the lubricating properties of the magnetooptical disk with the floating magnetic head.

The floating head is positioned on the recording film 2 with a flying gap of several μm to several tens μm and is provided for recording, erasing and reproducing information. The flying gap is maintained by the balance between the depressing force by a suspension spring which functions to press the floating head against the recording film 2 and the ascending force by air flow due to the high-speed revolution of the magnetooptical disk, which functions to raise the floating head apart from the recording film 2.

In the case where CSS (Contact-Start-Stop) mode in which the floating head comes in contact with the magnetooptical disk was adopted, if the head is sticking to the disk, the head may be damaged upon the start of operation. With the magnetooptical disk, however, the provision of the lubricating film enhances the lubricating properties of the disk with the head, thereby preventing the damage of the head due to sticking.

Example 8

The thickness of the $SiO_2$ film as the moisture-impermeable film 4 in the optical disk fabricated in Example 1 was varied.

Then, calculated was the relationship between the thickness of the moisture-impermeable film 4 and the reflectance thereof as light was applied to the disk from the second protective film 5 side.

Calculation was performed with respect to three-layer models having sequentially a polycarbonate substrate as the plastic substrate 1, a $SiO_2$ film as the moisture-impermeable film 4, and a UV-setting urethane acrylate resin film as the second protective film 5. Respective refractive indexes of the polycarbonate substrate, $SiO_2$ film and UV-setting urethane acrylate resin film were 1.58, 1.45 and 1.5. The thickness of the second protective film 5 was 10 μm. The wavelength of the light was 780 nm which was the wavelength of a semiconductor laser being widely used as a light source for optical disks. Reflectance was calculated with the thickness of the moisture-impermeable film 4 as a parameter varying within the range of 0–300 nm.

Figure 9:
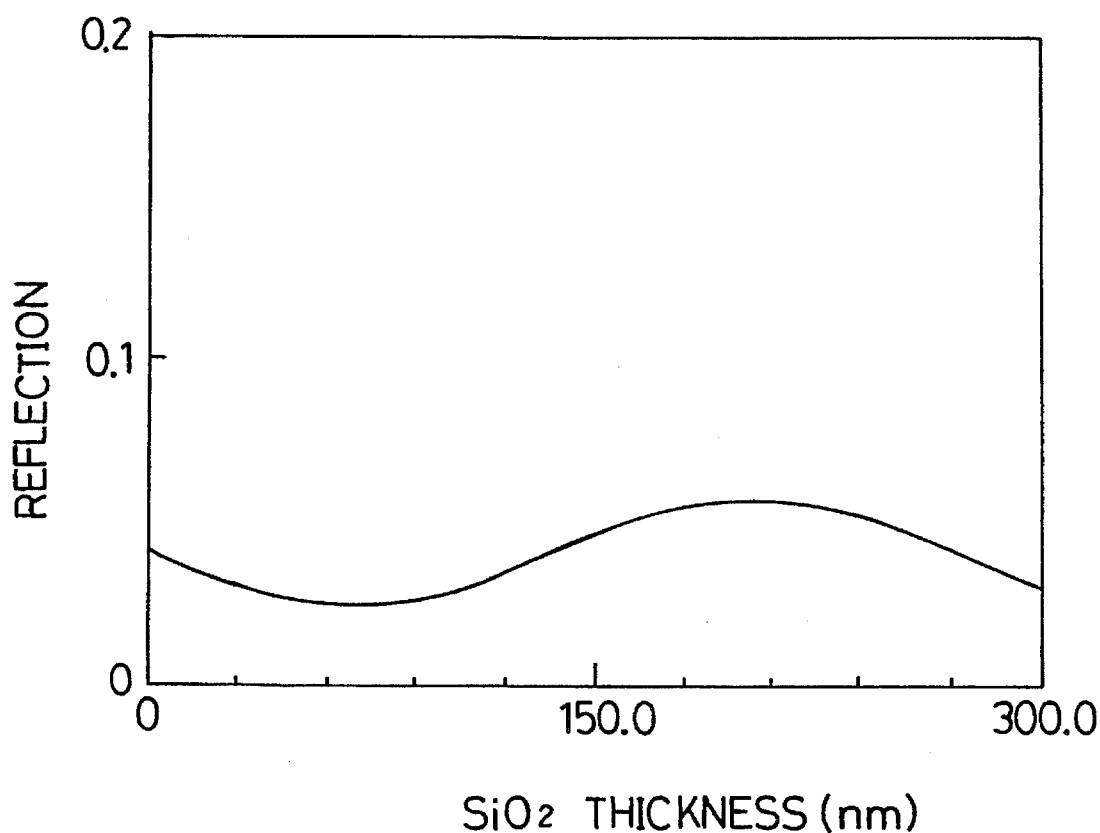
FIG. 9 is a graph showing the relationship between the thickness of a moisture-impermeable film ($SiO_2$) and the reflectance of the optical disk fabricated in Example 8.
Figure 10:
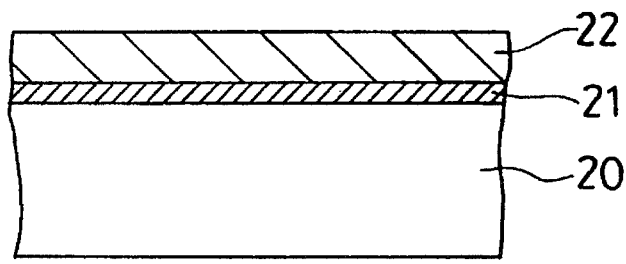
FIG. 10 is a sectional view illustrating a structure of an conventional optical disk.

The result of the calculation is shown by a graph in FIG. 9 in which a horizontal line represents the thickness of $SiO_2$ film, and a vertical line represents the reflectance.

The result of the reflectance calculation reveals that the reflectance comes to the lowest and interference fringe almost disappears when the thickness of the $SiO_2$ film is within about 60–90 nm. Further, as stated in Example 5, interference fringe almost disappears when the reflectance is less than about 8%, and thus it can be understood that interference fringe is not observed even if the thickness of the $SiO_2$ film is less than 20 nm. Accordingly, it is advantageous to set the thickness of the $SiO_2$ film as the moisture-impermeable film to less than 20 nm for minimizing the fabrication cost and time, provided that the moisture-impermeable effect of the film is sufficient.

As seen above, the present invention can provide a highly reliable optical disk with minimum warpage, antistat effect and sufficient hardness of the disk surface to be flaw-free.

What is claimed is:

1. An optical disk comprising:
  a) a transparent plastic substrate;
  b) a recording film formed on one side surface of said substrate;
  c) a first protective film covering said recording film; and
  d) a moisture-impermeable film formed on the other side of said substrate;
  wherein at least one of the first protective film and the moisture-impermeable film is coated with a synthetic resin film containing a powder of a transparent conductive material;
  wherein the moisture impermeable film is further covered with a second protective film made of substantially the same material as the first protective film; and
  wherein only one substrate exists in the disk structure.

2. An optical disk as set forth in claim 1, wherein the moisture-impermeable film is made of polyvinylidene chloride or polytrifluorochloroethylene.

3. An optical disk as set forth in claim 1, wherein the moisture-impermeable film is selected from the group consisting of $SiO_2$, SiO, ZnS, $Al_2O_3$, SiN, SiAlON and AlN.

4. An optical disk as set forth in claim 1, wherein the moisture-impermeable film is a AlN film of 1–20 nm thick.

5. An optical disk as set forth in claim 1, wherein the moisture-impermeable film is made of polyvinylidende chloride or polytrifluorochloroethylene and has a thickness of 2–20 μm.

6. An optical disk as set forth in claim 1, further having an intermediate film between the moisture-impermeable film and the substrate comprising a UV-setting urethane acrylate resin.

7. An optical disk as set forth in claim 1 wherein the first protective film is made of a UV-setting urethane acrylate resin, polyvinylidene chloride or polytrifluorochloroethylene.

8. An optical disk as set forth in claim 1, wherein the first protective film is made of a synthetic resin containing a powder of a transparent conductive material.

9. An optical disk as set forth in claim 8 wherein the powder of the transparent conductive material is selected from the group consisting of $SnO_2$, $SnO_2$—$Sb_2O_5$, $In_2O_3$ and $In_2O_3$—$SnO_2$.

10. An optical disk as set forth in claim 1 wherein the powder of the transparent conductive material is selected from the group consisting of $SnO_2$, $SnO_2$—$Sb_2O_5$, $In_2O_3$ and $In_2O_3$—$SnO_2$.

11. An optical disk as set forth in claim 1 wherein the first and second protective films have similar moisture absorption characteristics.

12. An optical disk as set forth in claim 1 wherein the moisture impermeable film has a thickness form about 1 to about 300 nm.

13. An optical disk as set forth in claim 1 wherein the first and second protective films are a UV curing urethane acrylate resin containing a transparent conductive substance in powder form.

14. The disk of claim 1 wherein the first protective film and the second protective film are formed of substantially the same thickness.

15. An optical disk consisting essentially of
  a) only one transparent plastic substrate,
  b) a recording film formed on one side surface of said substrate,
  c) a first protective film covering said recording film, and
  d) a moisture-impermeable film formed on the other side of said substrate,
  wherein the moisture-impermeable film is further covered with a second protective film made of substantially the same material as that of the first protective film,
  wherein the first and second protective films are a UV curing urethane acrylate resin containing a transparent conductive substance in powder form.

16. An optical disk consisting essentially of:
  only one transparent plastic substrate;
  a recording film formed on one side surface of said substrate;
  a first protective film covering said recording film, and
  a moisture-impermeable film formed on the other side of said substrate,
  wherein the moisture-impermeable film is further covered with a second protective film, and the first and the second protective films have substantially the same moisture absorption properties.

17. The disk of claim 16 wherein the first and second protective films are made of a synthetic resin.

18. The disk of claim 17 wherein the resin contains a powder of a transparent conductive material.

19. The disk of claim 16 wherein the first protective film is made of a urethane acrylate synthetic resin and the second protective film is made of a synthetic resin containing a powder of a transparent conductive material, the first protective film being different from the second protective film in thickness.

20. The disk of claim 16 wherein the moisture-impermeable film is selected from the group consisting of $SiO_2$, SiO, ZnS, $Al_2O_3$, SiN, SiAlOn and AlN.

21. The disk of claim 16 wherein the moisture-impermeable film is an AlN film of 1 to 20 nm thick.

22. The disk of claim 16 wherein at least the second protective film is covered with an anti-static film.

23. The disk of claim 16 wherein the first and the second protective films are covered with an anti-static film.

24. The disk of claim 16 wherein at least the second protective film is covered with an anti-static film, and the first and the second protective films are made of a UV curing urethane acrylate resin.

25. The disk of claim 16 wherein the first protective film and the second protective film are formed of substantially the same materials and have substantially the same thickness.

26. The disk of claim 25 wherein the material for forming the first protective film and the second protective film is a plastic resin.

27. The disk of claim 16 wherein the first protective film and the second protective film have respectively different thicknesses.

28. The disk of claim 27 wherein the material for forming the first protective film and the second protective film is a plastic resin.

29. The disk of claim 15 wherein the first protective film and the second protective film are formed of substantially the same thickness.

* * * * *